(12) United States Patent
Jung et al.

(10) Patent No.: US 7,904,405 B2
(45) Date of Patent: Mar. 8, 2011

(54) SYSTEM AND METHOD FOR MANAGING OUTCOME INFORMATION BASED ON URI DATA WHEREIN KNOWLEDGE IS EXTENDED BY USING AN INFERENCE RULE FOR AN INFERENCE SERVICE BASED ON THE SEMANTIC WEB

(75) Inventors: Han Min Jung, Daejeon (KR); Pyung Kim, Daejeon (KR); In Su Kang, Gyeongsangbuk-Do (KR); Seoung Woo Lee, Daejeon (KR); Mi Kyung Lee, Gyeongsangbuk-Do (KR); Won Kyung Sung, Daejeon (KR); Dong In Park, Seoul (KR)

(73) Assignee: Korea Institute of Science & Technology Information, Daejeon (KR)

( * ) Notice: Subject to any disclaimer, the term of this patent is extended or adjusted under 35 U.S.C. 154(b) by 0 days.

(21) Appl. No.: 11/576,457

(22) PCT Filed: Oct. 12, 2006

(86) PCT No.: PCT/KR2006/004096
§ 371 (c)(1),
(2), (4) Date: Mar. 30, 2007

(87) PCT Pub. No.: WO2008/026795
PCT Pub. Date: Mar. 6, 2008

(65) Prior Publication Data
US 2009/0204564 A1    Aug. 13, 2009

(30) Foreign Application Priority Data

Aug. 28, 2006 (KR) .................. 10-2006-0081788

(51) Int. Cl.
*G06F 17/00* (2006.01)
(52) U.S. Cl. .......................................................... 706/47
(58) Field of Classification Search .................... 706/55, 706/62, 45–4, 628; 707/706–708, 794
See application file for complete search history.

(56) References Cited

U.S. PATENT DOCUMENTS
5,355,445 A    10/1994    Shibao et al.
(Continued)

FOREIGN PATENT DOCUMENTS
JP    2006-099341 A    4/2006

OTHER PUBLICATIONS

Written Opinion of the International Searching Authority for PCT/KR2006/004096 mailed May 25, 2007.

(Continued)

*Primary Examiner* — David R Vincent
(74) *Attorney, Agent, or Firm* — LRK Patent Law Firm (57) ABSTRACT

A system for managing outcome information based on URI comprises an outcome information managing unit that registers and manages outcome information; a URI managing unit that is connected to the outcome information managing unit and imparts a URI to the outcome information through a URI server so as to manage the outcome information; and a knowledge extending unit that is connected to the outcome information managing unit and the URI managing unit and extends knowledge by using an inference rule for an inference service based on the Semantic Web.

22 Claims, 8 Drawing Sheets

U.S. PATENT DOCUMENTS

| | | | |
|---|---|---|---|
| 7,680,862 B2 * | 3/2010 | Chong et al. | 707/753 |
| 7,689,910 B2 * | 3/2010 | Hennum et al. | 715/255 |
| 7,702,725 B2 * | 4/2010 | Erickson et al. | 709/203 |
| 2004/0230572 A1 | 11/2004 | Omoigui | |
| 2006/0100995 A1 | 5/2006 | Albornoz | |

OTHER PUBLICATIONS

International Preliminary Report on Patentability for PCT/KR2006/004096 issued Mar. 3, 2009.

International Search Report for PCT/KR2006/004096 mailed May 25, 2007.

European Search Report for European Patent Application No. 06799176.0 which corresponds to U.S. Appl. No. 11/576,457.

Klein M, "Interpreting XML Documents via an RDF Schema Ontology", Database and Expert Systems Applications, 2002. Proceedings. 13th International Workshop on Sep. 2-6, 2002, Piscataway, NJ, USA, IEEE, Sep. 2, 2002, pp. 755-759, XP010612118, ISBN: 978-0-7695-1668-4, the whole document.

Jeremy J Carroll et al, "Jena: Implementing the Semantic Web Recommendations" Proceedings of the 13th International Conference on World Wide Web—Alternate Track Papers & Posters, WWW 2004, New York, NY, USA, ACM, May 17, 2004, pp. 74-83, XP002588476, ISBN: 978-1-58113-912-9, Retrieved from the Internet: URL:http://citeseerx.ist.psu.edu/viewdoc/summary?doi=10.1.1.2.2412, the whole document.

Harris S et al, "SPARQL Query Processing with Conventional Relational Database Systems", Web Information Systems Engineering—WISE 205 Workshops Lecture Notes in Computer Science;;LNCS, Springer, Berlin, DE, vol. 3807/2005, Dec. 31, 2005, pp. 235-244, XP002588477, ISBN: 978-3-540-30018-2, the whole document.

Tzvetkov V et al, "DBXML-Connecting XML with Relational Databases", Computer and Information Technology, 2005, CIT 2005. The Fifth International Conference on Shanghai, China Sep. 21-23, 2005, Piscataway, NJ, USA, IEEE LNKD-DOI: 10.1109/CIT.2005.95, Sep. 21, 2005, pp. 130-135, XP010867674, ISBN: 978-0-7695-2432-0, the whole document.

\* cited by examiner

| ID | Subject | Predicate | Object | Time | Object URI | SENT |
|---|---|---|---|---|---|---|
| 1 | ... | ... | ... | 2006.6.19 10:25 | KISTI1.PCD.0001 | F |
| 2 | ... | ... | ... | 2006.6.19 9:26 | NULL | F |
| 3 | ... | ... | ... | 2006.6.18 13:20 | OWL | T | ent, URIs which can clearly
SYSTEM AND METHOD FOR MANAGING OUTCOME INFORMATION BASED ON URI DATA WHEREIN KNOWLEDGE IS EXTENDED BY USING AN INFERENCE RULE FOR AN INFERENCE SERVICE BASED ON THE SEMANTIC WEB

CLAIM OF PRIORITY

This application claims priority under 35 USC 371 to International Application No. PCT/KR2006/004096, filed on Oct. 12, 2006, which claims priority to Korean Patent Application No. 10-2006-0081788, filed on Aug. 28, 2006, each of which is incorporated by reference in its entirety.

TECHNICAL FIELD

The present invention relates to a system for managing outcome information based on URI and a method for the same, in which outcome information is registered and managed on the basis of URI (Uniform Resource Identifier) such that the outcome information agrees with the Semantic Web environment.

BACKGROUND ART

Recently, the age where the web is used to simply show information to a user has changed into a new age where the software of a user receives a result so as to automatically process a lot of tasks. When a web service technology is applied to various services such as electronic commercial transaction and information searching which are currently achieved on the web, a lot of tasks which have not been automatically processed so far can be automated. Then, it is possible to maximize the productivity and effectiveness of information systems as well as the convenience for users.

Recently, the structure of information existing on the web is being changed. That is, information having a new form, which can be analyzed and processed by computers, is being added to the existing information. The information is referred to as meta data. When the meta data is added into the current web, computers can analyze the meaning of information through the meta data and processes the information, which is referred to as 'Semantic Web'.

In the Semantic Web which can be understood by a computer, information is easily searched, shared, reused, and combined. That it, languages and rules which can be understood by computers are prescribed so that communication between computers can be achieved.

The Semantic Web has been constructed as an idea of Tim Berners-Lee, an inventor of the World Wide Web and is considered as one standard, a computer language, and an information processing technology.

The Semantic Web is composed of XML (eXtensible Markup Language), XML schema, RDF (Resource Description Framework), RDF schema, and OWL (Ontology Web Language). As for a related research, there are ontology based on RDF and a topic map researched by ISO (International Organization for Standardization). The ontology is a technique where attributes are imparted to the web such that the meaning of information can be easily understood, and the topic map is a technique where knowledge and information are separately managed through a new language such as XTM (XML Topic Maps) based on XML.

In the Semantic Web, computers can understand the web pages in accordance with rules so as to search and provide various sites. Therefore, it is convenient to effectively manage an enormous information network. Further, it is possible to provide graphs or data created by using a spread sheet. Therefore, the Semantic Web can be utilized in the electronic commercial transaction, the system integration, an intelligent robot system and the like.

Particularly, when the Semantic Web is applied to electronic commercial transaction, a lot of tasks which have not been able to be processed can be automatically processed. In a typical type of Internet shopping, a purchaser visits Internet shopping mails, sees products, and selects a product to purchase. On the Semantic Web, however, meta information on a product standard, a transaction condition and the like as well as product information is provided in each Internet shopping mall. In such an environment, computers can perform price negotiation as well as searching of a desired product in place of people.

The Semantic Web can be effectively utilized in a B-to-B system integration field and a value-added searching field as well as in the electronic commercial transaction. Further, the Semantic Web is considered to be a core technology which can change the paradigm of information communication in the near future.

In the existing web service, the WSDL (Web Service Description Language) based on XML (eXtensible Markup Language) is used. In the Semantic Web service, however, a web service description language such as DAML-S (DAPRA Agent Markup Language-Service) based on an ontology language is used. Researches on the Semantic Web service are performed in view of web service searching, web service driving, web service configuration, web service execution monitoring and the like.

In the Semantic Web environment, URIs which can clearly discriminate information are essential, and information needs to be formalized so as to be represented by ontology.

Conventionally, however, such a technique has not been developed, which can effectively design an actual information flow by registering and managing outcome information in the Semantic Web environment.

DISCLOSURE

Technical Problem

An advantage of the present invention is that it provides a system for managing outcome information based on URI and a method for the same, in which outcome information is registered and managed on the basis of URI (Uniform Resource Identifier) such that the outcome information agrees with the Semantic Web environment.

Technical Solution

According to an aspect of the invention, a system for managing outcome information based on URI comprises an outcome information managing unit that registers and manages outcome information; a URI managing unit that is connected to the outcome information managing unit and imparts a URI to the outcome information through a URI server so as to manage the outcome information; and a knowledge extending unit that is connected to the outcome information managing unit and the URI managing unit and extends knowledge by using an inference rule for an inference service based on the Semantic Web. According to another aspect of the invention, a method for managing outcome information comprises registering and managing outcome information; imparting a URI to the managed outcome information so as to manage; and extending knowledge such that the managed outcome information is applied to an inference service based on the Semantic Web.

ADVANTAGEOUS EFFECTS

According to the present invention, is possible to register and manage outcome information ion the basis of URI (Uniform Resource Identifier) such that the outcome information agrees with the Semantic Web environment.

BEST MODE

Hereinafter, a system for managing outcome information based on URI and a method for the same according to an embodiment of the present invention till be described with reference to the drawings.

Figure 1:
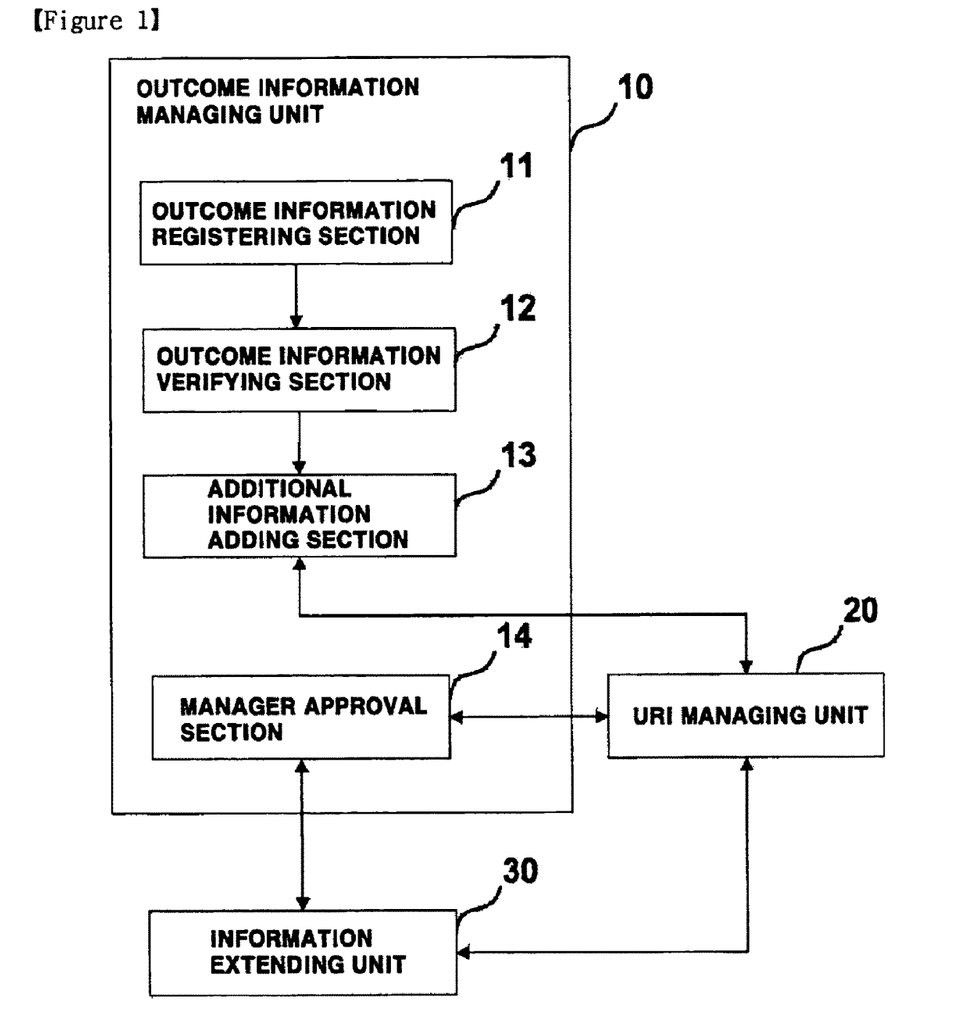
FIG. 1 is a block diagram showing the configuration of a system for managing outcome information based on URI according to an embodiment of the present invention.

FIG. 1 is a block diagram showing the configuration of a system for managing outcome information based on URI according to an embodiment of the invention.

As shown in FIG. 1, the system includes an outcome information managing unit 10 which registers and manages outcome information; a URI managing unit 20 which is connected to the outcome information managing section 10 and imparts a URI to outcome information through a URI server; and a knowledge extending unit 30 which is connected to the outcome information managing unit 10 and the URI managing unit 20 and extends knowledge by using an inference rule for an inference service based on the Semantic Web.

The outcome information managing unit 10 includes an outcome information registering section 11 having an outcome information registration interface through which a registerer registers outcome information and a corresponding outcome; an outcome information verifying section 12 which verifies whether the information inputted by the registerer through the outcome information registering section 11 is correct or not an additional information adding section 13 which imparts an outcome weight to the outcome information verified by the outcome information verifying section 12 or extracts a controlled subjected or field from the output information or the outcome so as to allocate; and a manager approval section 14 which performs a manager-verification process on the outcome information registered by the outcome information managing section 10.

In the outcome information registering section 11, the outcome information includes at least one or more of an outcome type, an outcome source, an induction subject, a creator, creator information, a title, a co-creator and a related URL.

In the outcome information registering section 11, the outcome is a format document which can be filtered or a scanned image.

The manager approval section 14 verifies whether registered outcome information is correct or not and whether the outcome information exists or not, in order to impart reliability to the outcome information. Through the manager approval section 14, a manager can approve or reject the corresponding outcome information. The rejected outcome information is recreated and is then registered or discarded.

The URI managing unit 20 registers and manages outcome information which is managed by the outcome information managing unit 10, imparts an URI to the outcome information, and extracts an RDF triple or RDF XML from the outcome information such that the information can be made into knowledge so as to be used for knowledge extension.

In the knowledge extending section 30, extended knowledge is referred to for obtaining an inference result by using a Semantic Web query language including SPARQL (Simple Protocol And RDF Query Language) and RDQL (RDF Data Query Language) or SQL.

Figure 2:
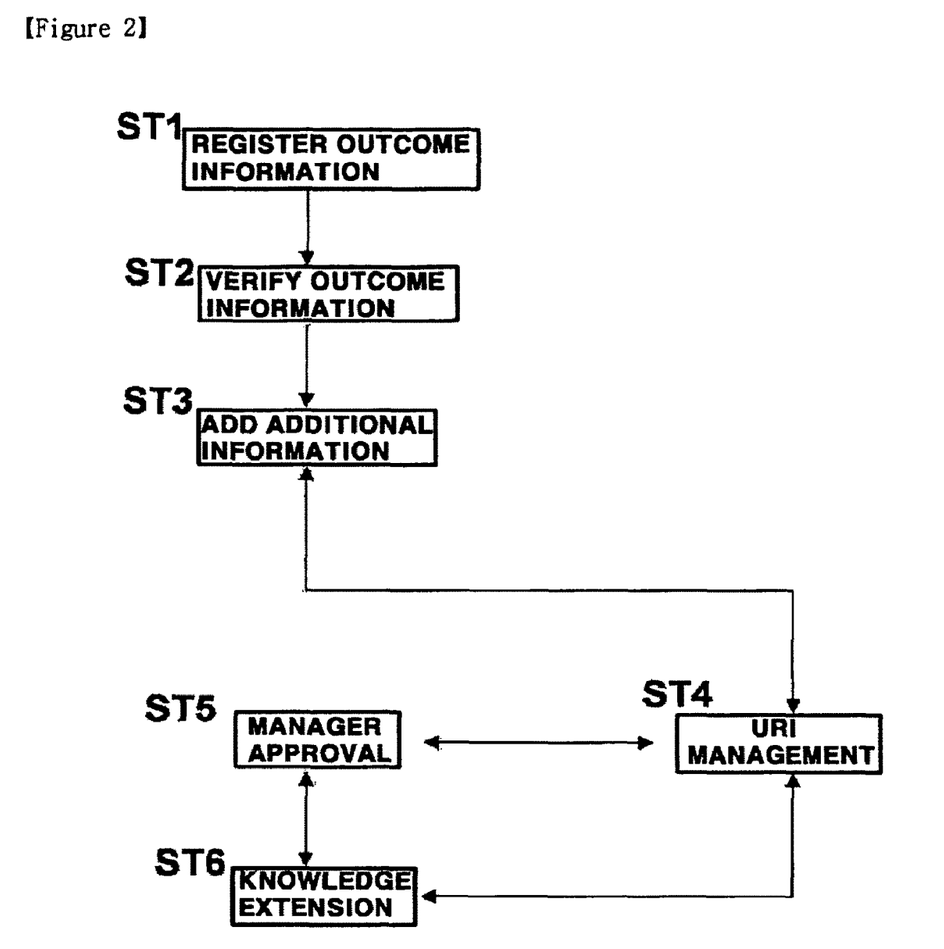
FIG. 2 is a flow chart showing a method for managing outcome information based on URI according to an embodiment of the invention.

FIG. 2 is a flow chart showing a method for managing outcome information based on URI according to an embodiment of the invention.

As shown in FIG. 2, the method for managing outcome information based on URI includes registering and managing outcome information (ST1 to ST3 and ST5); imparting a URI to the managed outcome information to manage (ST4); extending knowledge such that the managed outcome information is applied to an inference service based on the Semantic Web (ST6).

The registering and managing of the outcome information (ST1 to ST3 and ST5) includes a first step (ST1) of registering outcome information and a corresponding outcome through the outcome information registration interface; a second step (ST2) of verifying whether the registered outcome information is correct or not a third step (ST3) of imparting an outcome weight to the verified outcome information or extracting a controlled subject or field from the outcome information or the outcome so as to allocate; and a fifth step (ST5) of performing a manager-verification process on the outcome information.

In the first step (ST1), the outcome information includes at least one or more of an outcome type, an outcome source, an induction subject, creator, creator information, a title, a co-creator, and a related URL.

In the second step (ST2), the outcome is a format document which can be filtered or a scanned image.

In the fifth step (ST5), it is verified whether registered outcome information is correct or not and whether the outcome information exists or not, in order to impart reliability to the outcome information. Further, a manager can approve or reject the corresponding outcome information. The rejected outcome information is recreated and is then registered or discarded.

In the imparting of the URI (ST4), the outcome information managed in the first step (ST1) is registered and managed, an URI is imparted to the outcome information, and a RDF triple or RDF XML is extracted from the outcome information such that the information is made into knowledge so as to be used for knowledge extension.

In the extending of the knowledge (ST6), the extended knowledge is referred to for obtaining an inference result by using Semantic Web query languages including SPARQL and RDQL or SQL.

Figure 3:
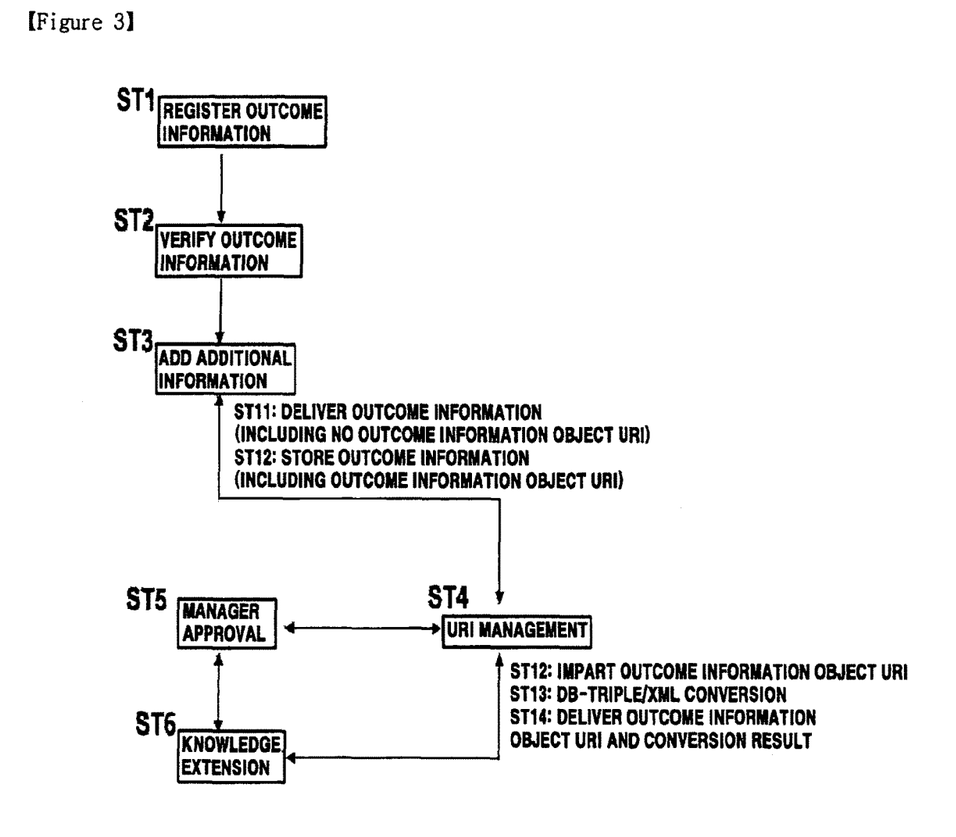
FIG. 3 is a flow chart showing a process of registering outcome information in detail.

FIG. 3 is a flow chart showing a process of registering outcome information in detail.

As shown in FIG. 3, the method for managing outcome information based on URI further includes eleventh and twelfth steps (ST11 and ST12) of verifying the duplication and error of outcome information and allocating an outcome information object URI; a thirteenth step (ST13) of converting the corresponding outcome information to a DB-triple or DB-XML; and fourteenth and fifteenth steps (ST14 and ST15) of storing the converted outcome information.

Figure 4:
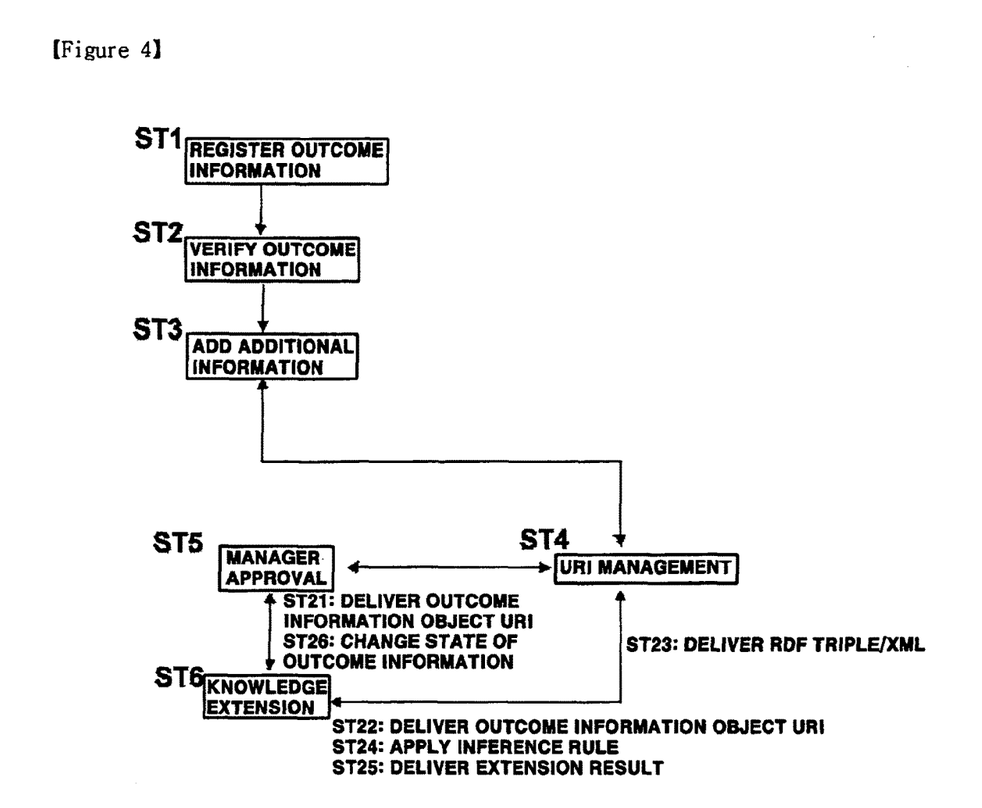
FIG. 4 is a flow chart showing a process of approving outcome information in detail.

FIG. 4 is a flow chart showing a process of approving outcome information in detail.

As shown in FIG. 4, the method for managing outcome information based on URI further includes a 21st step of approving outcome information (ST21), 22nd and 23rd steps of obtaining a RDF triple/XML of outcome information by using a corresponding outcome information object URI (ST22 and ST23), a 24th step of extending knowledge by applying an inference rule (ST24), and 25th and 26th step of changing the state of the outcome information after the extending of the knowledge.

Figure 5:
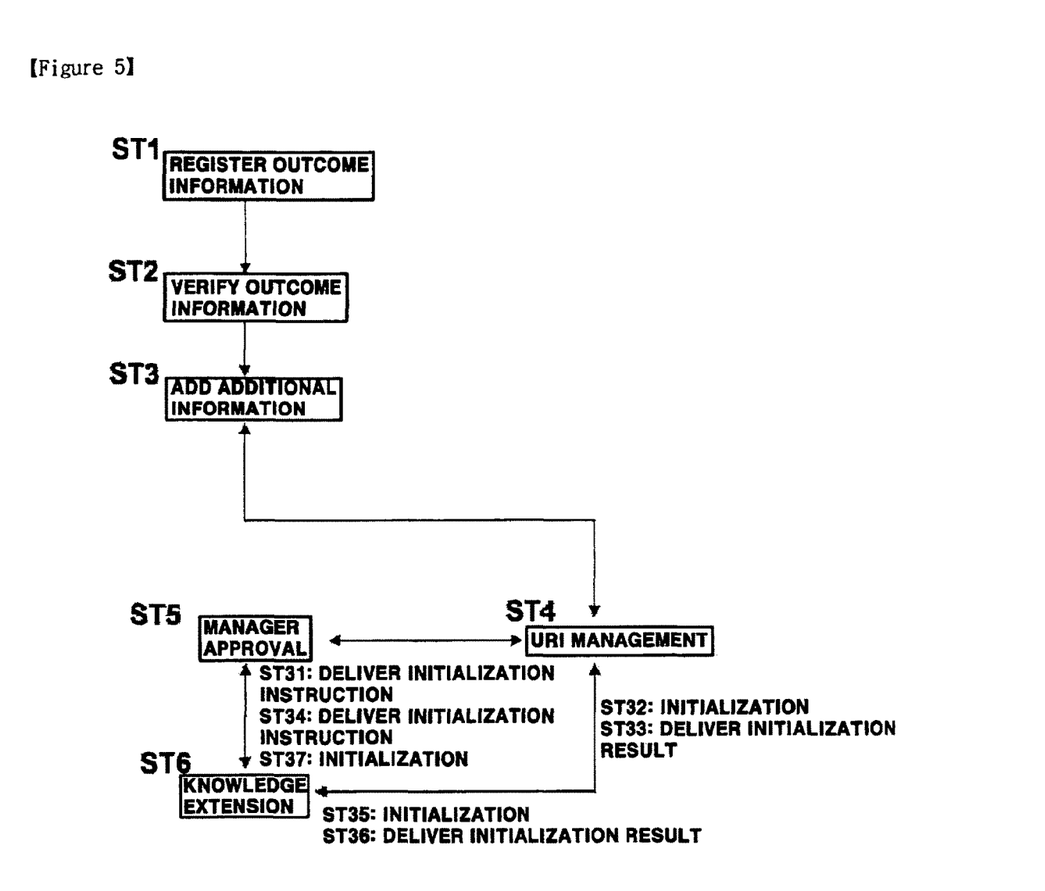
FIG. 5 is a flow chart showing a process of initializing outcome information in detail.

FIG. 5 is a flow chart showing a process of initializing outcome information in detail.

As shown in FIG. 5, the method for managing outcome information based on URI further includes a 31st step in which the outcome information managing unit 10 delivers an initialization instruction to the URI managing unit 20 (ST31), 32nd and 33rd steps in which the URI managing unit 20 is initialized and then delivers the initialization result to the outcome information managing unit 10 (ST32 and ST33), a 34th step in which the outcome information managing unit 10 delivers an initialization instruction to the knowledge extending unit 30 (ST34), 35th and 36th steps in which the knowledge extending unit 30 is initialized and then delivers the initialization result to the outcome information managing unit 10 (ST35 and ST36), and a 37th step in which the outcome information managing unit 10 is initialized (ST37).

Figure 6:
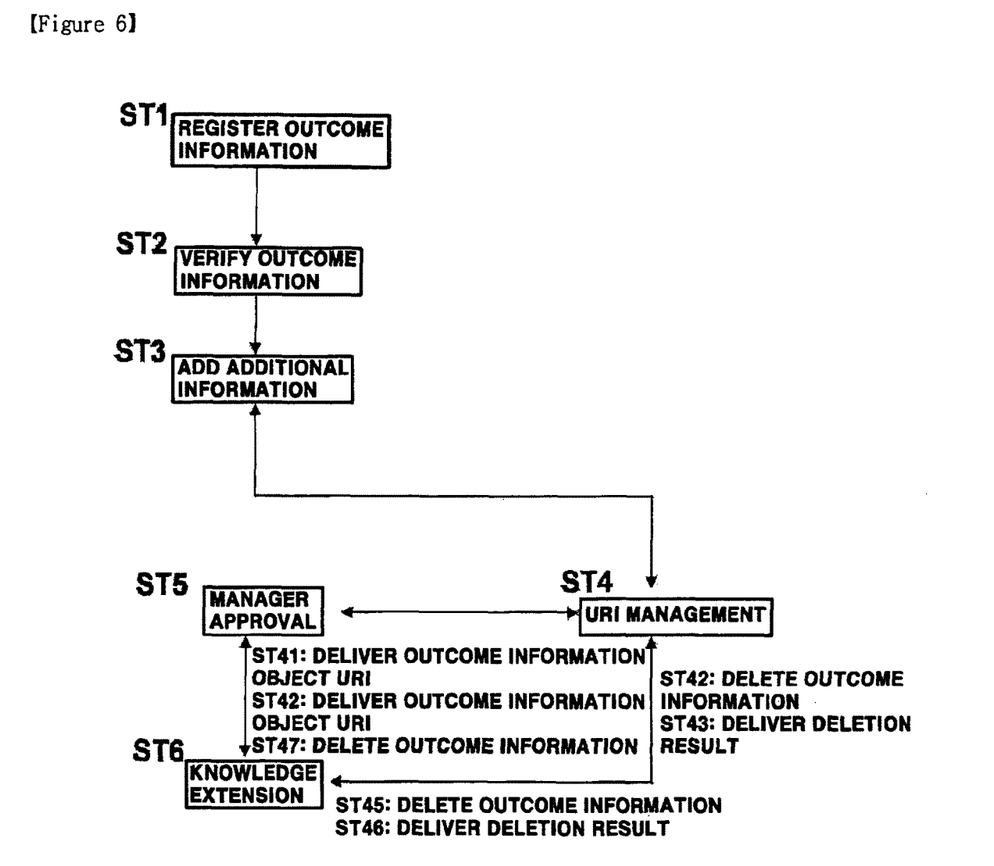
FIG. 6 is a flow chart showing a process of deleting outcome information in detail.

FIG. 6 is a flow chart showing a process of deleting outcome information in detail.

As shown in FIG. 6, the method for managing outcome information based on URI further includes a 41st step in which the outcome information managing unit 10 delivers an outcome information object URI to the URI managing unit 20 (ST41), 42nd and 43rd steps in which the URI managing unit 20 deletes corresponding outcome information and then delivers the deletion result to the outcome information managing unit 10 (ST42 and ST43), a 44th step in which the outcome information managing unit 10 delivers an outcome information object URI to the knowledge extending unit 30, 45th and 46th steps in which the knowledge extending unit 30 deletes outcome information and then delivers the deletion result to the outcome information managing unit 10 (ST45 and ST46), and a 47th step (ST47) in which the outcome information managing unit 10 deletes outcome information.

Figure 7:
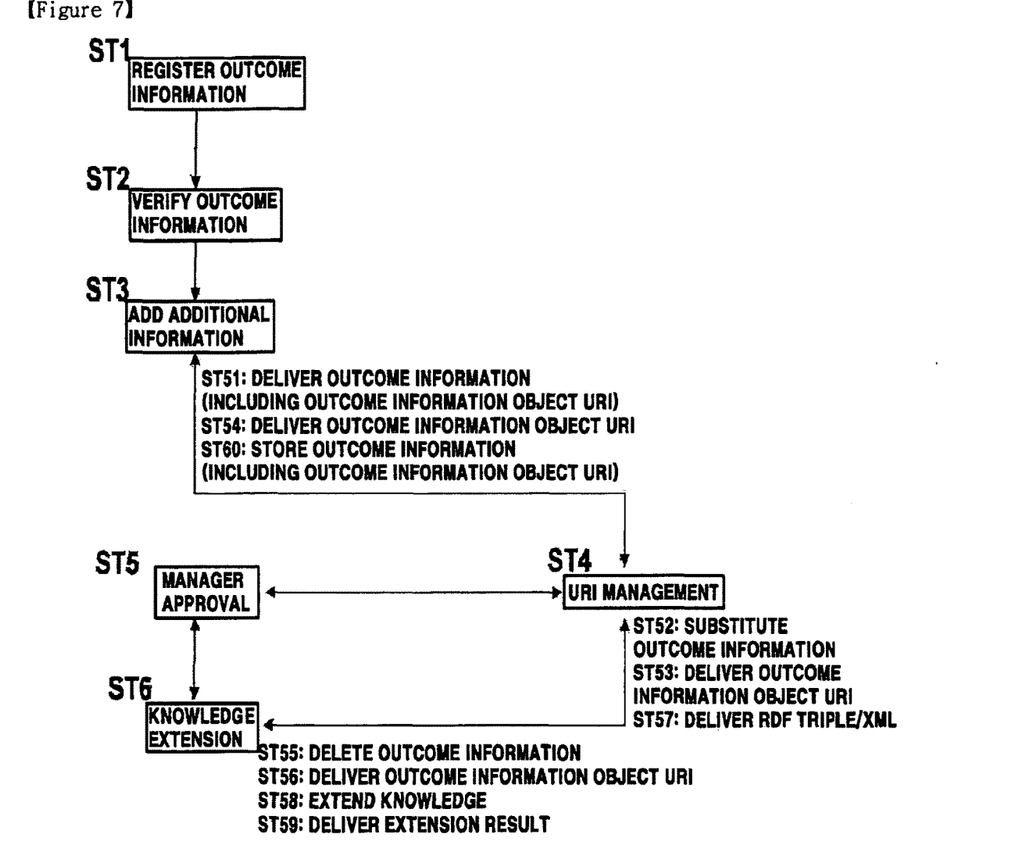
FIG. 7 is a flow chart showing a process of correcting outcome information in detail.

FIG. 7 is a flow chart showing a process of correcting outcome information in detail.

As shown in FIG. 7, the method for managing outcome information based on URI further includes a 51st step in which the outcome information managing unit 10 delivers outcome information including an outcome information object URI to the URI managing unit 20 (ST51), 52nd and 53rd steps in which the URI managing unit 20 substitutes the outcome information and then delivers the outcome information object URI to the outcome information managing unit 10 (ST52 and ST53), a 54th step in which the outcome information managing unit 10 delivers an outcome information object URI to the knowledge extending unit 30 (ST54), 55th and 56th steps in which the knowledge extending unit 30 deletes corresponding outcome information and then delivers the outcome information object URI to the managing unit 20 (ST55 and ST56), a 57th step in which the URI managing unit 20 delivers an RDF triple/XML to the knowledge extending unit 30 (ST57), 58th and 59th steps in which the knowledge extending unit 30 extends knowledge and then delivers the extension result to the outcome information managing unit 10 (ST58 and ST59), and a 60th step in which the outcome information managing unit 10 stores the outcome information including the outcome information object URI.

Figure 8:
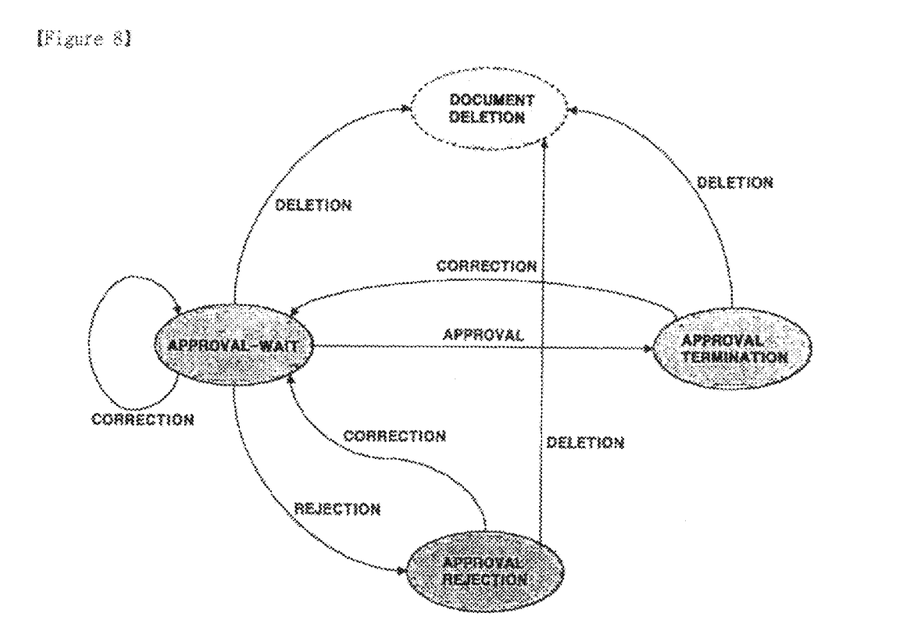
FIG. 8 is a flow chart showing a process of changing a state of outcome information in detail.

FIG. 8 is a flow chart showing a process of changing a state of outcome information in detail.

As shown in FIG. 8, the method for managing outcome information based on URI further includes an approval-wait state which is set when outcome information is registered; an approval-completion state which is set when a manager approves the outcome information in the approval-wait state; an approval-rejection state which is set when the manager rejects the outcome information in the approval-wait state; and a document deletion state which is set to delete a document if the deletion is selected in the approval-wait state, the approval completion state, or the approval-rejection state.

Figure 9:
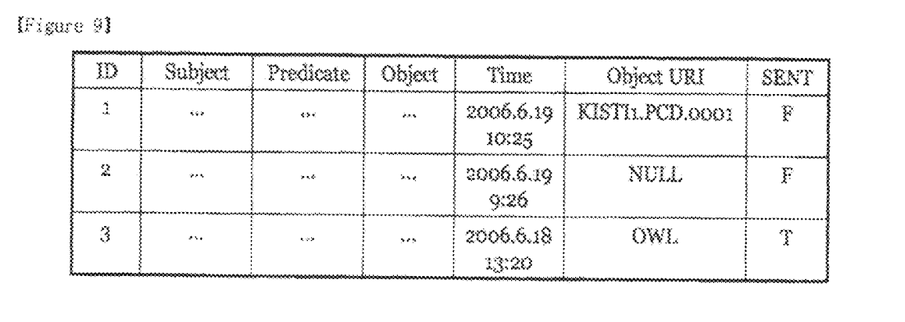
FIG. 9 is a table showing an example of an RDF triple and related Information which is used for URI management.

FIG. 9 is a table showing an example of an RDF triple and related information which is used for URI management.

As shown in FIG. 9, the method for managing outcome information based on URI includes managing an RDF triple by using a DBMS; dividing the type of RDF triple depending on outcome information, non-outcome information, and ontology schema; and using a state field so as to check whether an RDF triple is used or not.

Further, the method for managing outcome information based on URI repeatedly performs the registering of the outcome information and the approving of the outcome information such that the outcome information is collectively registered.

Hereinafter, the system for managing outcome information based on URI and the method for the same will be described with reference to the drawings. When it is judged that the specific description of related known function or constitution can cloud the point of the invention, the description will be omitted. Terms to be described below are defined in consideration of the functions of the invention and can differ in accordance with the intension of a user or operator or the practice. Accordingly, the meanings of the terms should be interpreted on the basis of the contents of the specification.

In the invention, outcome information is registered and managed on the basis of URI such that the outcome information agrees with the Semantic Web environment.

Further, the method will be described, which registers and manages a variety of information including outcome information by using a URI and an RDF triple or RDF XML based on the Semantic Web.

The method includes an outcome information registering method, a manager approval method, an outcome information initializing method, an outcome method deleting method, and an outcome information correcting method.

In the invention, outcome information is stored/managed by using an RDF triple or RDF XML represented as ontology, and outcome objects are discriminated by using an URI such that the outcome information can be utilized correctly.

In order to store outcome information, a DBMS is used in the case of the RDF triple, and a storage device (having a function of parsing an XML-based document) based on XML is used in the case of the RDF XML.

In the system for managing outcome information based on URI and the method for the same, outcome information can be formalized in accordance with ontology schemas, continuous knowledge extension can be achieved in accordance with an inference rule, and a compatibility test of outcome information can easily performed through the verification process in the registration interface and each step.

Further, since all knowledge which can be represented by an RDF triple or RDF XML can be treated, it is expected that the invention can be essentially utilized in a Semantic Web-based application service.

FIG. 2 is a flow chart showing the method for managing outcome information based on URI according to an embodiment of the invention, showing the connection between the respective units in the entire system which registers and manages outcome information through the information exchange among the outcome information managing unit, the URI server, and the knowledge extension unit.

The method includes registering and managing outcome information (ST1 to ST3 and ST5), imparting a URI on outcome information through the URI server to manage the outcome information (ST4), and extending knowledge by using an inference rule for an inference service based on the Semantic Web (ST6).

The first step (ST1) of registering outcome information is where a registerer registers outcome information (meta data) and the corresponding outcome (the original document and the like) through the outcome information registration interface. The outcome information (meta data) includes an outcome type (for example, thesis, report, patent or the like), an outcome source (for example, scientific conference, scientific journal or the like), an induction subject, a creator (for example, thesis writer, research participant or the like), creator information (for example, creator's institute, creator's department or the like), a title, a co-creator, and a related URL.

The outcome may be a format document which can be filtered (so that a text can be extracted from the format document) or a scanned image. In the latter, a text can be extracted by using an optical character recognizer.

The second step (ST2) of verifying outcome information is to verify whether information inputted by a registerer is correct or not. That is, information inputted by a registerer is verified so that a registration error is prevented from occurring.

The third step (ST3) of adding additional information is where an outcome weight is imparted to outcome information or a controlled subject or field is extracted from outcome information (meta data) or an outcome so as to be allocated. Through this step, new information which is not inputted by a registerer can be acquired.

The fourth step (ST4) of imparting and managing an URI is where outcome information (meta data) is registered and managed, an URI is imparted to the outcome information, and an RDF triple or RDF XML is extracted from the outcome information such that the information is made into knowledge so as to be used for knowledge extension. The knowledge management (where information is made into knowledge) can be defined as follows. Ontology is reflected in information such that object properties is included in the information, and then the information is instantiated.

The managing of the URI can be performed through the URI server. In this case, a user interface is provided for registration, searching, management and the like.

The fifth step (ST5) of performing a manager-verification process is where the registered information is verified by a manager. In this step, it can be verified whether the registered information is correct or not and whether the registered information actually exists or not. Then, it is possible to impart reliability to the outcome information. The manager can approve or reject the corresponding outcome information. The rejected outcome information is recreated and is then registered or discarded.

The sixth step (ST6) of extending knowledge is to discover additional connections such that knowledge can be easily used in an inference service based on the Semantic Web. In this step, an inference rule is applied so as to extend the knowledge created in the URI management. The extended knowledge is referred to for obtaining an inference result by using Semantic Web query languages, such as SPARQL (Simple Protocol And RDF Query Language) and RDQL (RDF Data Query Language), or SQL.

FIG. 3 is a flow chart showing the process of registering outcome information in detail, showing that outcome information is registered by allocating an outcome information object URI to the outcome information and converting the outcome information into a DB-triple or DB-XML.

That is, FIG. 3 shows the steps (ST1 to ST4) of registering outcome information.

Outcome information (meta data) to which additional information is added is discriminated from other outcome information (meta data), when an object URI is allocated to the outcome information. Therefore, the outcome information is delivered to the URI server such that an object URI is allocated to the outcome information (ST11).

The URI server imparts an outcome information object URI to the delivered outcome information (meta data) (ST12). At this time, it is checked whether the corresponding outcome information (meta data) is duplicate with existing outcome information to which outcome information object URIs are allocated. When the outcome information is duplicate outcome information, an outcome information object URI is not imparted.

The thirteenth step (ST13) of DB-triple/XML conversion is where outcome information (meta data) inputted by referring to ontology is converted into an RDF triple or RDF XML. This conversion process is referred to as the knowledge management, and the conversion result is referred to as the knowledge.

When the DB-tripe/XML conversion is normally terminated, the URI server returns the outcome information object URI of the corresponding outcome information (meta data) and the conversion result to the outcome information registration interface (ST14).

When the DB-triple/XML conversion is terminated, the outcome information (meta data) is once again stored in the outcome information managing unit (ST15).

This outcome information (meta data) includes an outcome information object URI. The outcome information is once again stored, in order to separately provide an outcome information searching service in the outcome information managing unit. Further, the outcome information (meta data) is stored in the URI server, in order to judge whether the outcome information (meta data) is duplicated or not. However, two units may be integrated so that outcome information is not doubly stored, without the URI server being provided.

FIG. 4 is a flow chart showing the process of approving outcome information in detail, showing that outcome information is approved by a manager and the state of the outcome information is changed so that the outcome information is approved.

That is, FIG. 4 shows the steps (ST4 to ST6) in which outcome information is approved by a manager.

The manager can approve or reject outcome information (meta data) in an approval-wait state through an approval interface. When the manager approves the outcome information, the corresponding outcome information object URI is delivered to the knowledge extending unit (ST21).

The knowledge extending unit delivers the outcome information object URI to the URI managing unit (ST22), and then receives an RDF triple/XML related to the outcome information object URI as a result (ST23).

An inference rule is applied to the corresponding RDF triple/XML such that the extended RDF triple/XML is acquired (ST24).

When the extension result is successful, the outcome information managing unit changes the state of the corresponding outcome information (meta data) to the termination (ST25 and ST26).

FIG. 5 is a flow chart showing process of initializing outcome information in detail, showing that outcome information is initialized through an initialization instruction between the outcome information managing unit and the URI server.

That is, FIG. 5 shows the steps (ST4 to ST6) of initializing outcome information.

A manager selects the initialization of outcome information (meta data) in the outcome information managing unit.

An initialization instruction is first delivered to the URI server (ST31).

The URI server initializes an outcome information (meta data) DB and then delivers the initialization result to the outcome information managing unit (ST32 and ST33).

The initialization instruction is delivered to the knowledge extending unit (ST34).

The knowledge extending unit deletes all the RDF triples/XML and then delivers the deletion result to the outcome information managing unit (ST35 and ST36).

Finally, the outcome information managing unit deletes the contents within its outcome information (meta data) DB (ST37).

FIG. 6 is a flow chart showing the process of deleting outcome information in detail, showing that specific outcome information is deleted sing an outcome information object URI.

FIG. 6 shows the steps (ST4 to ST6) of deleting outcome information.

A manager selects the deletion of specific outcome information (meta data) in the outcome information managing unit.

An outcome information object URI with a deletion instruction is first to the URI server (ST41).

The URI server deletes the corresponding outcome information (meta data) and then delivers the deletion result to the outcome information managing unit (ST42 and ST43).

The outcome information object URI with a deletion instruction is then delivered to the knowledge extending unit (ST44).

The knowledge extending unit deletes an RDF triple/XML corresponding to the corresponding outcome information and then delivers the deletion result to the outcome information managing unit (ST45 and ST46).

Finally, the outcome information managing unit deletes the outcome information in its outcome information (meta data) DU (ST47).

FIG. 7 is a flow chart showing the process of correcting outcome information in detail, showing that specific outcome information is updated by using an out come information object URI and outcome information.

That is, FIG. 7 shows the steps (ST3 to ST6) of updating outcome information.

When specific outcome information (meta data) is corrected by the outcome information managing unit, the outcome information (meta data) including a corresponding outcome information object URI is delivered to the URI server (ST51).

Since this outcome information (meta data) is the updated outcome information (meta data), the outcome information substitutes corresponding outcome information (meta data) within the URI server (ST52).

The outcome information object URI is delivered to the outcome information managing unit and is then delivered to the knowledge extending unit (ST53 and ST54).

The knowledge extending unit deletes an RDF triple/XML related to the outcome information and receives the RDF triple/XML, which is updated through the above-described process such as the process of approving outcome information, so as to perform knowledge extension (ST55 to ST58).

The extension result is delivered to the outcome information managing unit, and the outcome information managing unit stores the updated outcome information (ST59 and ST60).

FIG. 8 is a flow chart showing the process of changing a state of outcome information in detail, showing a state change flow including a process where the state of outcome information is continuously changed by a manager and a registerer.

When outcome information (meta data) is registered, the outcome information is in the approval-wait state. A manager can approve or reject the outcome information (meta data) in the approval-wait state. Such a state can be continuously changed as long as the corresponding outcome information (meta data) is not deleted. In the case of outcome information, it is necessary for a manager to check whether the outcome information is correct or not. In this case, the approval procedure should be separated, and the provision of the outcome information to a user should be controlled in such a manner that the state of the information is changed. When outcome information which is not approved is unconditionally opened to a user, and if the outcome information has a problem, confusion can occur.

In the system for managing outcome information, outcome information (meta data) can be registered for each case, but a large volume of outcome information which is verified by a manager can be registered collectively. When a large volume of outcome information is registered collectively, the registering of the outcome information and the approving of the outcome information (ST1 to ST6) are repeatedly performed.

When a registration error occurs in specific outcome information (meta data) at the time of the collective registration, the error is stored in an error log, and only the corresponding outcome information (meta data) is checked so as to be again registered. Outcome information (meta data) which is approved at the time of the collective registration can be opened through an application system such that users can search the information and use the service.

FIG. 9 is a table showing an example of RDF triple and related information which are used for the URI management of FIG. 2, showing DBMS-based RDF triples and related information for dividing and managing the type of RDF triple depending on outcome information, non-outcome information, and ontology schema.

In FIG. 9, a field of 'Object URI' stores an outcome information object DPI related to a corresponding triple, and an RDF triple is divided into 'Subject', 'Predicate', and 'Object' so as to be stored. However, the RDF triple may be stored in one field so as to be analyzed and used if necessary.

A field of 'Time' indicates the time when a corresponding RDF triple is registered in a DB, and a field of 'SENT' indicates whether the corresponding RDE triple is delivered to the knowledge extending unit or not. When the field of 'SENT' is represented as 'T', it means that an ROE triple is delivered to the knowledge extending unit. When the field of 'SENT' is represented as 'F', it means that an RDF triple is not delivered to the knowledge extending unit. In such a manner, RDF triples to be used for the knowledge extension are managed so as not to be duplicated or omitted. Ontology schemas should be converted into RDF triples in order to perform consistent processing.

When the field of 'Object URI' is represented as 'OWL', it means an RDF triple for ontology schema. When the field of 'Object URI' is represented as 'NULL' it means an RDF triple which has no relation with outcome information.

In FIG. 9, it is described that outcome information is processed as RDF triples on the basis of DBMS. However, when RDF XML is used, the above-described fields may be included on the basis of an XML document.

The construction and operation of the invention will be arranged and briefly described as follows.

1) Method of Registering and Managing Outcome Information (Shown in FIGS. 1 and 2)

Outcome information is registered and managed, a URI is imparted to the outcome information through the URI server, and knowledge is extended by using an inference rule for an inference service based on the Semantic Web.

2) Method of Registering Outcome Information (Shown in FIG. 3)

Duplication and error of outcome information are verified so that an UPI is allocated to the outcome information, the outcome information is converted into a DB-triple/XML, and the converted outcome information is finally stored.

3) Method of Approving Outcome Information (Shown in FIG. 4)

Outcome information is approved by a manager, an RDF triple/XML of the outcome information is acquired by using a corresponding outcome information object URI, knowledge is extended by applying an inference rule, and the state of the outcome information after the knowledge extension is changed.

4) Method of Initializing Outcome Information (Shown in FIG. 5)

Outcome information is initialized through an instruction flow among the outcome information managing unit, the URI server, and the knowledge extending unit.

5) Method of Deleting Outcome Information (Shown in FIG. 6)

Specific outcome information is deleted by using an outcome information object DPI.

6) Method of Correcting Outcome Information (Shown in FIG. 7)

Specific outcome information is corrected by using an outcome information object DRI and outcome information, and knowledge is extended.

7) Method of Changing a State of Outcome Information (Shown in FIG. 8)

A state of outcome information is changed by a manager or a registerer, and the state change of outcome information is supported.

8) Method of Managing RDF Triples (Shown in FIG. 9)

RDF triples are managed by using DBMS, the type of RDF triple is divided and managed depending on outcome information, non-outcome information, and ontology schema, and a state field is used so as to check whether an RDF triple is used or not.

9) Method of Managing RDF XML

RDF XML is managed by using an XML document, the type of RDF XML is divided and managed depending on outcome information, non-outcome information, and ontology schema, and a state field is used so as to check whether RDF XML is used or not.

10) Method of Collectively Registering Outcome Information

A lager volume of outcome information is registered by repeatedly performing the steps of registering and managing outcome information shown in FIGS. 2 to 4.

According to the present invention, outcome information is registered and managed on the basis of URI such that the outcome information agrees with the Semantic Web environment

The invention claimed is:

1. A system for managing outcome information based on URI comprising:
an outcome information managing unit that registers and manages outcome information;
a URI managing unit that is connected to the outcome information managing unit and imparts a URI to the outcome information through a URI server so as to manage the outcome information; and
a knowledge extending unit that is connected to the outcome information managing unit and the URI managing unit and extends knowledge by using an inference rule for an inference service based on the Semantic Web,
wherein the system comprises a computing device including one or more processors and wherein the URI server comprises a computing device including one or more processors.

2. The system for managing outcome information according to claim 1, wherein the outcome information managing unit includes:
an outcome information registering section having an outcome information registration interface through which a registerer registers outcome information and a corresponding outcome;
an outcome information verifying section that verifies whether information inputted by the registerer through the outcome information registering section is correct or not;
an additional information adding section that imparts an outcome weight to outcome information verified by the outcome information verifying section or extracts a controlled subject or field from the outcome information or the outcome so as to allocate; and
a manager approval section that performs a manager-verification process on the outcome information registered by the outcome information managing unit.

3. The system for managing outcome information according to claim 2, wherein the outcome information in the outcome information registering section includes at least one or more of an outcome type, an outcome source, an induction subject, a creator, creator information, a title, a co-creator, and a related URL.

4. The system for managing outcome information according to claim 2, wherein the outcome in the outcome information registering section is a format document which can be filtered or a scanned image.

5. The system for managing outcome information according to claim 2, wherein the manager approval section verifies whether registered outcome information is correct or not and whether the outcome information exists or not, in order to impart reliability to the outcome information, and a manager approves or rejects the corresponding outcome information such that the rejected outcome information is recreated and is then registered or discarded.

6. The system for managing outcome information according to any one of claims 1 to 5, wherein the URI managing unit registers and manages outcome information which is managed by the outcome information managing unit, imparts a URI to the outcome information, and extracts a RDF triple or RDF XML from the outcome information such that the information is made into knowledge so as to be used for knowledge extension.

7. The system for managing outcome information according to any one of claims 1 to 5, wherein the knowledge extended by the knowledge extending unit is referred to for obtaining an inference result by using Semantic Web query languages including SPARQL and RDQL or SQL.

8. A method for managing outcome information comprising:
   registering and managing outcome information;
   imparting a URI to the managed outcome information so as to manage; and
   extending knowledge such that the managed outcome information is applied to an inference service based on the Semantic Web,
   wherein the method is executed on a system including a computing device including one or more processors.

9. The method for managing outcome information according to claim 8, wherein the registering and managing of the outcome information includes:
   registering outcome information and a corresponding outcome through an outcome information registration interface;
   verifying whether the information inputted in the first step registering operation is correct or not;
   imparting an outcome weight to the outcome information verified in the verifying operation or extracting a controlled subject or field from the outcome information or the outcome so as to allocate; and
   performing a manager-verification process on the outcome information registered in the third step imparting operation.

10. The method for managing outcome information according to claim 9, the outcome information in the registering operation includes at least one or more of an outcome type, an outcome source, an induction subject, a creator, creator information, a title, a co-creator, and a related URL.

11. The method for managing outcome information according to claim 9, wherein the outcome in the registering operation is a format document which can be filtered or a scanned image.

12. The method for managing outcome information according to claim 8, wherein in the performing manager-verification operation, it is verified whether registered outcome information is correct or not and whether the outcome information exists or not, in order to impart reliability to the outcome information, and a manager approves or rejects the corresponding outcome information such that the rejected outcome information is recreated and is then registered or discarded.

13. The method for managing outcome information according to claim 8, wherein the imparting of the URI includes:
   registering and managing the outcome information which is managed in the first step registering operation;
   imparting a URI to the outcome information; and
   extracting an RDF triple or RDF XML from the outcome information such that the information is made into knowledge so as to be used for knowledge extension.

14. The method for managing outcome information according to claim 8, wherein the knowledge extended in the extending of the knowledge is referred to for obtaining an inference result by using Semantic Web query languages including SPARQL and RDQL or SQL.

15. The method for managing outcome information according to any one of claims 8 to 14 further comprising:
   verifying the duplication and error of outcome information and allocating an outcome information object URI to the outcome information;
   converting the outcome information to a DB-triple or DB-XML; and
   storing the converted outcome information.

16. The method for managing outcome information according to any one of claims 8 to 14 further comprising:
   approving outcome information;
   acquiring an RDF triple/XML of the outcome information by using a corresponding outcome information object URI;
   extending knowledge by applying an inference rule; and
   changing the state of the outcome information after the extension is terminated.

17. The method for managing outcome information according to any one of claims 8 to 14 further comprising:
   at an outcome information managing unit, delivering an initialization instruction to a URI managing unit;
   initializing the URI managing unit and, at the URI managing unit, delivering the initialization result to the outcome information managing unit;
   at the outcome information managing unit, delivering an initialization instruction to the knowledge extending unit;
   initializing the knowledge extending unit and, at the knowledge extending unit, delivering the initialization result to the outcome information managing unit; and
   initializing the outcome information managing unit.

18. The method for managing outcome information according to any one of claims 8 to 14 further comprising:
   at an outcome information managing unit, delivering an outcome information object URI to a URI managing unit;
   at the URI managing unit, deleting corresponding outcome information and then delivering the deletion result to the outcome information managing unit;
   at the outcome information managing unit, delivering the outcome information object URI to a knowledge extending unit;
   at the knowledge extending unit, deleting corresponding outcome information and then delivering the deletion result to the outcome information managing unit; and
   at the outcome information managing unit, deleting corresponding outcome information.

19. The method for managing outcome information according to any one of claims 8 to 14 further comprising:
   at an outcome information managing unit, delivering outcome information including an outcome information object URI to a URI managing unit;
   at the URI managing unit, substituting the outcome information and then delivering the outcome information object URI to the outcome information managing unit;
   at the outcome information managing unit, delivering the outcome information object URI to a knowledge extending unit;

at the knowledge extending unit, deleting corresponding outcome information and then delivering the outcome information object URI to the URI managing unit;

at the URI managing unit, delivering an RDF triple/XML to the knowledge extending unit;

at the knowledge extending unit, extending knowledge and then delivering the extension result to the outcome information managing unit; and at the outcome information managing unit, storing the outcome information including the outcome information object URI.

20. The method for managing outcome information according to any one of claims 8 to 14 further comprising:

an approval-wait state which is set when outcome information is registered;

an approval-completion state which is set when a manager approves the outcome information in the approval-wait state;

an approval-rejection state which is set when the manager rejects the outcome information in the approval-wait state; and a document-deletion state which is set to delete a document when deletion is selected in the approval-wait state, the approval-termination state, and the approval-rejection state.

21. The method for managing outcome information according to any one of claims 8 to 14 further comprising:

managing an RDF triple by using a DBMS;

dividing the type of RDF triple depending on outcome information, non-outcome information, and ontology schema so as to manage the RDF triple; and using a state field so as to check whether an RDF triple is used or not.

22. The method for managing outcome information according to any one of claims 8 to 14, wherein the registering and the approving of the outcome information are repeatedly performed so that outcome information is collectively registered.

* * * * *